United States Patent [19]

Capriotti et al.

[11] Patent Number: 4,848,148
[45] Date of Patent: Jul. 18, 1989

[54] CYCLIC MOTION DETECTION ARRANGEMENT

[75] Inventors: Roberto Capriotti, Bensalem; George W. Schneider, Jr., Huntingdon Valley, both of Pa.

[73] Assignee: American Meter Company, Philadelphia, Pa.

[21] Appl. No.: 211,199

[22] Filed: Jun. 24, 1988

[51] Int. Cl.$^4$ ............................................... G01F 3/20
[52] U.S. Cl. ................................. 73/262; 73/861.77; 73/272 R
[58] Field of Search ................ 73/861.77, 272 R, 262, 73/861.05, 861.79, 269, 270, 3, 263; 324/204, 207, 208, 239, 251, 206

[56] References Cited

U.S. PATENT DOCUMENTS

| | | | |
|---|---|---|---|
| 3,636,767 | 1/1972 | Duffy | 73/861.77 |
| 4,294,262 | 10/1981 | Williams et al. | 73/861.79 |
| 4,488,113 | 12/1984 | Heemstra | 324/207 |
| 4,565,090 | 1/1986 | Gotanda | 73/861.77 |
| 4,658,654 | 4/1987 | Ozaki et al. | 73/861.05 |

FOREIGN PATENT DOCUMENTS 52-45953 4/1977 Japan.
61-529120 11/1986 Japan.

*Primary Examiner*—Herbert Goldstein
*Attorney, Agent, or Firm*—David L. Davis

[57] ABSTRACT

An arrangement for detecting cycles of operation of a positive displacement diaphragm gas meter sets up a magnetic field which is directed through the non-magnetic housing of the meter toward an internal cyclically moving ferromagnetic element of the meter. The strength of the magnetic field is varied as the ferromagnetic element moves toward and away from the source of the magnetic field. The strength of the magnetic field is detected and an output signal representative thereof is processed to define cycles of operation of the meter.

7 Claims, 1 Drawing Sheet

CYCLIC MOTION DETECTION ARRANGEMENT

BACKGROUND OF THE INVENTION

This invention relates to motion detection arrangements and, more particularly, to an improved non-invasive arrangement for detecting the periodic pathwise movement of a ferromagnetic element enclosed within a non-magnetic housing.

Gas meters for domestic and industrial use are typically of the positive displacement diaphragm type. Such a meter conventionally includes a housing with a vertical central partition dividing the housing into two sets of measuring chambers. Within each chamber is a flexible bellows (or convoluted sleeve diaphragm) connected to a central crankshaft by means of connecting rods. The crankshaft actuates a valve system which admits gas in and out of the bellows system. The bellows are caused to expand and contract by the passage of gas through the meter and act in the same manner as pistons to accurately displace a fixed volume of gas for each stroke, or cycle, of the bellows.

One complete cycle of the bellows produces one turn of the crankshaft. In addition to being connected to the valve system, the crankshaft is also connected, through gearing, to a mechanical counter on the front of the meter. This counter is conventionally known as an index and usually contains one circular sweep hand for testing the accuracy of the meter. The dial including this circular sweep hand is commonly called the proving dial. On typical household domestic type meters, the proving dial indicates a flow of two cubic feet of gas through the meter for each turn of its sweep hand. However, due to the connecting gearing, the crankshaft usually makes eighteen turns for each turn of the proving dial sweep hand. Thus, eighteen complete cycles of the bellows are needed for one cycle of the proving dial sweep hand.

Meter accuracy is determined by measuring the actual volume of gas flowing through the meter for each turn of the proving hand. Meters are usually tested at 20% and 100% of their flow rate capacity. Since a domestic type meter normally has a capacity of 250 cubic feet per hour, it requires two minutes and twenty-four seconds for the proving hand to indicate two cubic feet at the 20% capacity rate. This is extremely time consuming when testing meters on a production basis. Accordingly, it is an object of this invention to provide an arrangement for reducing the amount of time required to test meters for accuracy.

It would be desirable to be able to detect a single turn of the crankshaft. At the 20% capacity rate, this would take only eight seconds and at the 100% capacity rate, only one and six-tenths seconds. Therefore, by basing the meter accuracy test on only several turns of the crankshaft (i.e., several cycles of the bellows) considerable time could be saved in proving the meter accuracy. It is therefore another object of this invention to provide an arrangement for accurately detecting the cycles of operation of a meter.

It is a further object to this invention to provide such an arrangement which is non-invasive in nature so that the detecting arrangement does not in any way affect the meter operation.

SUMMARY OF THE INVENTION

In accordance with the principles of this invention, it is recognized that within the meter there are ferromagnetic parts which undergo cyclic motion, and that the meter housing is generally of non-magnetic material. Accordingly, a magnetic field is set up and directed through the housing to one of the moving ferromagnetic parts. The strength of the magnetic field varies in accordance with the position of that part. Since the motion of the part is cyclic, the magnetic field strength also varies cyclically. The field intensity is then detected and an electrical signal is produced which corresponds with the change in intensity of the magnetic field. This electrical signal is then processed for defining cycles of the meter.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
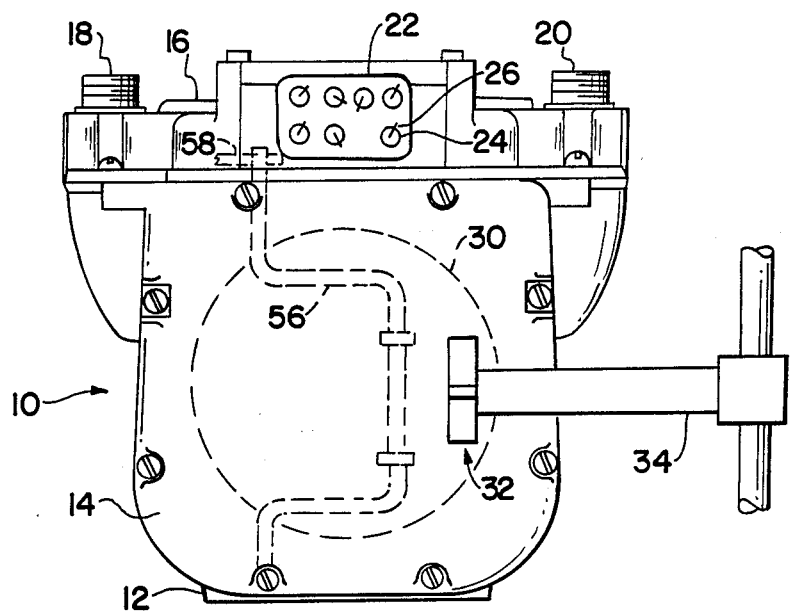
FIG. 1 is a front view of a conventional diaphragm meter showing a portion of an arrangement constructed in accordance with the principles of this invention in place for detecting cycles of operation of the meter.

Referring now to the drawings, FIG. 1 illustrates a positive displacement diaphragm gas meter, designated generally by the reference numeral 10, with which an arrangement constructed in accordance with the principles of this invention may be utilized. The meter 10 is illustratively of the type disclosed in U.S. Pat. No. 3,415,121, which issued on Dec. 10, 1968 to R. R. Douglas, and includes a main housing which comprises a body member 12, a front cover 14, a back cover (not shown) and a top cover 16. As is conventional, the top cover 16 has integral inlet and outlet fittings 18 and 20, respectively, for connection into a gas line. At the front of the top cover is an index 22, driven from a crankshaft through internal gearing. The index 22 has a plurality of dials including a proving dial 24 having a circular sweep hand 26. The foregoing details are conventional and well known in the art, and the reader is invited to refer to the aforementioned patent if further elaboration is desired.

It is conventional that all of the elements making up the housing of the meter 10 (i.e., the body member and the front, back and top covers) be manufactured from a non-magnetic material such as die cast aluminum. Alternatively, these members may be made of a molded plastic composition if the technology so permits.

Within the housing of the meter 10, is a bellows assembly which includes a convoluted diaphragm sleeve element 28 fixedly mounted at one end (not shown) and sealed at the other end by a bellows pan 30. As is conventional, the bellows pan 30 is made of stamped steel, which is a ferromagnetic material. The present invention makes use of the fact that during an operating cycle of the meter 10, the pan 30 travels over a known path. In particular, motion of the pan 30 is translatory toward and away from the front cover 14 over a distance S which is the stroke of the diaphragm 28. One complete cycle of this motion (i.e., from a position of the pan 30 closest to the front cover 14 to a position of the pan 30 furthest away from the front cover 14 and back to the position closest to the front cover 14) corresponds to one complete cycle of operation of the meter 10, which indicates that a known volume of gas has passed through the meter 10. It typically requires eighteen of these cycles for the proving hand 26 to make one complete rotation.

Figure 2:
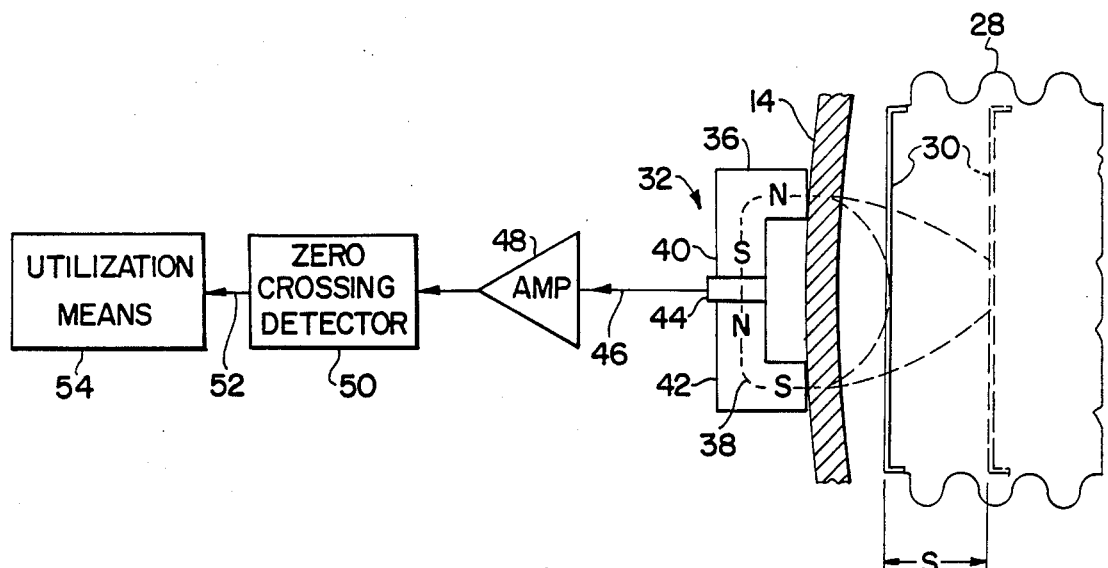
FIG. 2 is a schematic representation of the arrangement shown in FIG. 1 and taken as a side view through the meter illustrating changes in the magnetic field during the operation of the meter and the processing of electrical signals for defining cycles of operation of the meter.

According to this invention, motion of the pan 30 is detected to define an operating cycle of the meter 10. A proximity sensor, designated generally by the reference numeral 32, is held in position by a support 34 close to the front cover 14, as shown in FIG. 2, and within the projected area of the pan 30, as shown in FIG. 1.

Illustratively, the proximity sensor 32 includes a magnetic structure 36 having north and south magnetic poles so arranged that the magnetic lines of flux are directed through the non-magnetic front cover 14 of the meter and are attracted by the pan 30. As the bellows are cycled by the gas flow, the pan 30 moves between the positions shown in solid and broken lines. This results in a change in length of the magnetic flux lines 38, as shown in FIG. 2. The increased length of the magnetic flux lines 38 when the pan 30 is in the broken line position reduces the total amount of magnetic flux which can flow through the magnet structure 36. Preferably, the magnet structure 36 comprises magnets 40 and 42 which are spaced apart and arranged with their poles in series aiding relationship to provide for a magnetic field with the lines of flux 38 passing through both the magnets 40 and 42. In the space between the magnets 40 and 42 there is supported a magnetic flux detector 44. The flux detector 44 is preferably a Hall effect sensor, illustratively a Model 3501 Linear Hall Effect Sensor manufactured by Sprague Electric. The detector 44 provides an output signal on the lead 46 which is representative of the magnitude of magnetic flux passing through the detector 44. As the pan 30 moves toward and away from the proximity sensor 32, the magnitude of magnetic flux increases and decreases, respectively. Accordingly, the output signal on the lead 46 varies in this manner, approaching a sinusoidal form. This output signal is amplified by the amplifier 48 and provided as an input to zero crossing detector 50. Zero crossing detector 50 processes the amplified output signal and provides at its output on the lead 52 pulses corresponding in time to the zero crossings of the amplified output signal. Since a complete cycle of a sinusoidal signal includes two zero crossings, the time between alternate pulses on the lead 52 is the time for a single cycle of operation of the meter 10, which in turn corresponds to a fixed volume of gas passing through the meter 10. The pulses on the lead 52 are provided as an input to the utilization means 54 which utilizes those pulses to calculate the cycle time and determine the accuracy of the meter 10, in a manner well know in the art of meter proving.

Although the magnets 40 and 42 are illustrated as being L-shaped, this particular shape is not critical. What is required is a magnet structure so configured and positioned that the poles extend transverse to the housing 14 so that the magnetic field provided by the magnet structure is directed through the housing. Thus, a U- or horseshoe-shaped magnet structure would also be effective. Additionally, although the magnetic flux detector 44 is shown as being between separate magnets 40 and 42, what is critical is that the detector is mounted within the magnetic field. Further, while the illustrative embodiment shows cooperation with the pan 30 within the housing, any other ferromagnetic element of the meter which moves cyclically can be utilized. Thus, for example, either the flag rod 56 or the flag rod arm 58 which is used in the linkage between the pan 30 and the crankshaft, as is conventionally known, may be utilized as well, if it is made of ferromagnetic material.

Accordingly, there has been disclosed an improved arrangement for detecting periodic pathwise movement of a ferromagnetic element enclosed within a non-magnetic housing. It has been found that this arrangement, since it is not invasive, has no adverse effects upon the operation of the part whose motion is being detected. It is understood that the above-described embodiment is merely illustrative of the application of the principles of this invention. Numerous other embodiments may be devised by those skilled in the art without departing from the spirit and scope of this invention, as defined by the appended claims.

I claim:

1. An arrangement for non-invasively calibration testing a positive displacement diaphragm gas meter having a non-magnetic housing and an internal cyclically moving ferromagnetic bellows pan, said arrangement comprising:

a magnet;

means for supporting said magnet outside said housing and in proximity to said bellows pan so that movement of said bellows pan causes the strength of the magnetic field of said magnet to cyclically vary;

magnetic flux detector means for providing a signal representative of the magnitude of magnetic flux passing through said magnetic flux detector means;

means for mounting said magnetic flux detector means outside said housing and within the magnetic field of said magnet; and means utilizing said detector signal for defining cycles of operation of said meter.

2. An arrangement for non-invasively calibration testing a positive displacement diaphragm gas meter having a non-magnetic housing and an internal cyclically moving ferromagnetic flag rod, said arrangement comprising:

a magnet;

means for supporting said magnet outside said housing and in proximity of said flag rod so that movement of said flag rod causes the strength of the magnetic field of said magnet to cyclically vary;

magnetic flux detector means for providing a signal representative of the magnitude of magnetic flux passing through said magnetic flux detector means;

means for mounting said magnetic flux detector means outside said housing and with the magnetic field of said magnet; and means utilizing said detector signal for defining cycles of operation of said meter.

3. An arrangement for non-invasively calibration testing a positive displacement diaphragm gas meter having a non-magnetic housing and an internal cyclically moving ferromagnetic flag rod arm, said arrangement comprising:

a magnet;

means for supporting said magnet outside said housing and in proximity of said flag rod arm so that movement of said flag rod arm causes the strength of the magnetic field of said magnet to cyclically vary;

magnetic flux detector means for providing a signal representative of the magnitude of magnetic flux passing through said magnetic flux detector means;

means for mounting said magnetic flux detector means outside said housing and within the magnetic field of said magnet; and means utilizing said detector signal for defining cycles of operation of said meter.

4. An arrangement for non-invasively calibration testing a positive displacement diaphragm gas meter having a non-magnetic housing and an internal cyclically moving ferromagnetic element, said arrangement comprising:

a magnet having first and second series aiding parts;

means for supporting said magnet outside said housing and in proximity to said element so that movement of said element causes the strength of the magnetic field of said magnet to cyclically vary;

magnetic flux detector means for providing a signal representative of the magnitude of magnetic flux passing through said magnetic flux detector means;

means for mounting said magnetic flux detector means outside said housing and within the magnetic field of said magnet between said magnet parts; and means utilizing said detector signal for defining cycles of operation of said meter.

5. The arrangement according to claim 4 wherein the poles of said magnet extend transverse to said housing so that said magnetic field is directed through said housing.

6. The arrangement according to claim 4 wherein said magnetic flux detector means comprises a Hall effect sensor.

7. The arrangement according to claim 4 further comprising an amplifier and a zero crossing detector electrically coupled between said magnetic flux detector means and said utilizing means.

* * * * *

UNITED STATES PATENT OFFICE
CERTIFICATE OF CORRECTION

Patent No. 4,848,148        Dated July 18, 1989

Inventor(s) Roberto Capriotti and George W. Schneider, Jr.

It is certified that error appears in the above-identified patent and that said Letters Patent is hereby corrected as shown below:

Change the title to -- "NON-INVASIVE METER CALIBRATING ARRANGEMENT" --

Signed and Sealed this

Fifth Day of June, 1990

Attest:

HARRY F. MANBECK, JR.

*Attesting Officer*        *Commissioner of Patents and Trademarks*